March 14, 1950 M. A. NEFF 2,500,903

MAGNETIC WIRE SOUND RECORDING AND REPRODUCING APPARATUS

Filed Aug. 2, 1945 5 Sheets-Sheet 1

INVENTOR.

Mortimer A. Neff

BY

Harness, Dickey & Pierce

ATTORNEYS.

March 14, 1950 M. A. NEFF 2,500,903

MAGNETIC WIRE SOUND RECORDING AND REPRODUCING APPARATUS

Filed Aug. 2, 1945 5 Sheets-Sheet 2

INVENTOR.

*Mortimer A. Neff*

BY

*Harness, Dickey & Pierce*

ATTORNEYS.

March 14, 1950 | M. A. NEFF | 2,500,903
MAGNETIC WIRE SOUND RECORDING AND REPRODUCING APPARATUS
Filed Aug. 2, 1945 | 5 Sheets-Sheet 3

INVENTOR.
Mortimer A. Neff
BY
Harness, Dickey & Pierce
ATTORNEYS.

March 14, 1950 M. A. NEFF 2,500,903

MAGNETIC WIRE SOUND RECORDING AND REPRODUCING APPARATUS

Filed Aug. 2, 1945 5 Sheets-Sheet 4

INVENTOR.
Mortimer A. Neff.
BY
Harness, Dickey + Pierce
ATTORNEYS.

March 14, 1950 M. A. NEFF 2,500,903

MAGNETIC WIRE SOUND RECORDING AND REPRODUCING APPARATUS

Filed Aug. 2, 1945 5 Sheets-Sheet 5

INVENTOR.
Mortimer A. Neff.
BY
Harness, Dickey & Pierce
ATTORNEYS.

UNITED STATES PATENT OFFICE 2,500,903

MAGNETIC WIRE SOUND RECORDING AND REPRODUCING APPARATUS

Mortimer A. Neff, Birmingham, Mich., assignor to Wirecorder Corporation, Detroit, Mich., a corporation of Michigan Application August 2, 1945, Serial No. 608,531

4 Claims. (Cl. 242—54)

The present invention relates to a magnetic sound recording and reproducing apparatus, and the present invention constitutes an improvement in mechanism for the same purpose disclosed in the application of McLouth et al., Serial No. 577,848, filed February 14, 1945, for Magnetic wire sound recording and reproducing apparatus.

In apparatus of the above type it is highly desirable to employ removable magazines containing a wire spool and a take-up spool in order to facilitate changing wire records. Such magazines must be of the smallest possible size and greatest simplicity in order to permit acquisition and storage of a relatively large library of recordings. This necessitates, among other things, the use of spools of relatively small diameter which carry a relatively thick layer of wire. As a result, it is not possible to obtain a uniform speed of travel of the wire by a uniform rotation of the take-up spool. Consequently, a wire feeding means which engages the wire at a point between the two spools must be employed, and it is necessary to drive the take-up spool through a yielding clutch mechanism in order to maintain the wire in tension between the wire feeding means and the take-up spool at all times. In such mechanisms, means must be provided for disengaging the wire feeding means from the wire to permit removal of the magazine. Means must be provided to insure a level-winding of the wire on the spools, and the mechanism must be so arranged as to permit installation or removal of a magazine without the necessity of manually threading the wire. It is also desirable to provide means for rewinding the wire on the wire spool without the necessity of removing the magazine from the recording or reproducing apparatus.

It is the general object of the present invention to provide an improved and simplified apparatus which satisfies the above requirements.

Another object of the invention is to provide a mechanism of the above type which is so constructed as to prevent throwing loops or slack in the wire when it is started or stopped in either direction of movement.

Another object of the invention is to provide a novel combination of level-winding mechanism and recording or sound reproducing head.

Another object of the invention is to provide an improved and simplified form of removable magazine.

A further object of the invention is to provide means for resisting unwinding rotation of the wire spool during movement of the wire onto the take-up spool.

Another object of the invention is to provide simple manual control means for initiating the operation of the various elements of the mechanism in the desired sequence to effect either unwinding or rewinding of the wire.

Other objects and advantages will become apparent from the following specification, the accompanying drawings, and the appended claims:

In the drawings, Figure 1 is a plan view of the chassis and magazine in assembled relation with the top portion of the casings removed and parts in section.

As best shown in Figures 1, 2, 3, and 4 the apparatus of the present invention is mounted entirely upon a chassis 1 in the form of a flat plate which is enclosed within an upper housing 2 and is mounted upon a lower housing portion 3.

Figure 4:
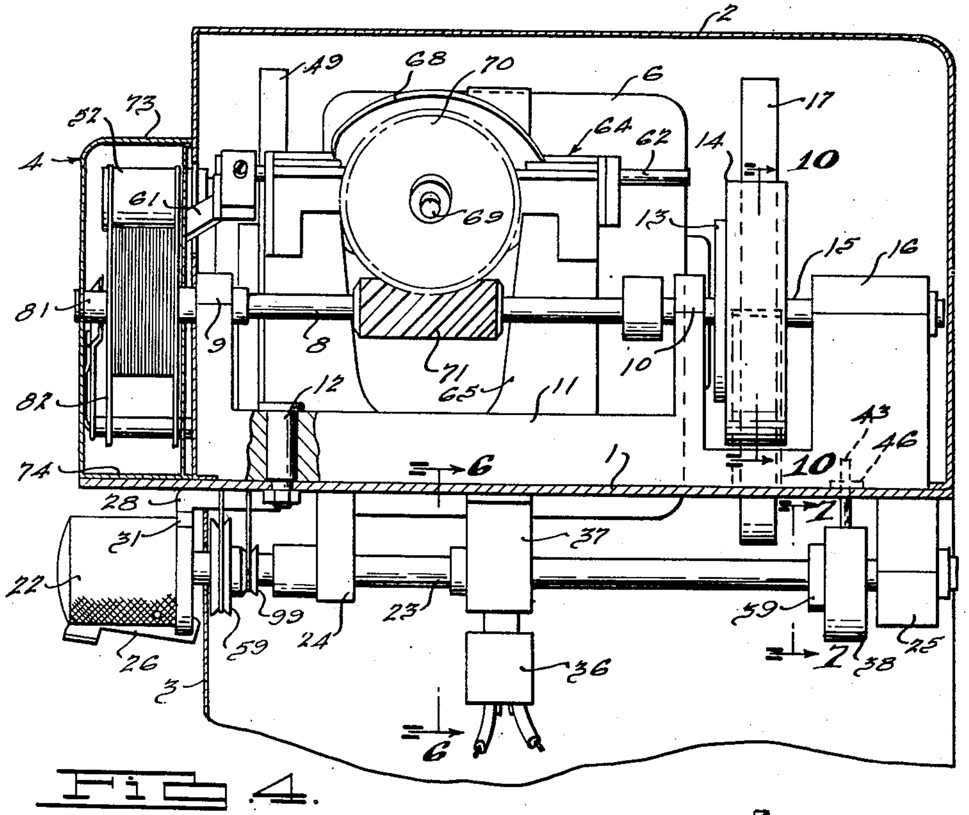
Figure 4 is a sectional view taken on the line 4—4 of Figure 1.

The housings 2 and 3 may be of any suitable construction and it will be understood that the electrical portions of the magnetic sound recording and reproducing apparatus may be enclosed within the housing 3 in the usual manner. Since these electrical circuits form no portion of the present invention they are neither illustrated nor described herein, but it will be understood that they are of any desired or conventional construction. The apparatus is provided with a removable spool magazine, indicated generally at 4, which may be detachably secured in any suitable manner to the housing 2 as by means of spring clips 5, shown best in Figure 1, which clips are fixed to the housing 2 and are engageable in recesses in the walls of the magazine 4. The bottom of the magazine rests upon a shelf formed by a forward extension of the chassis plate 1, as best shown in Figure 4.

Figure 1:
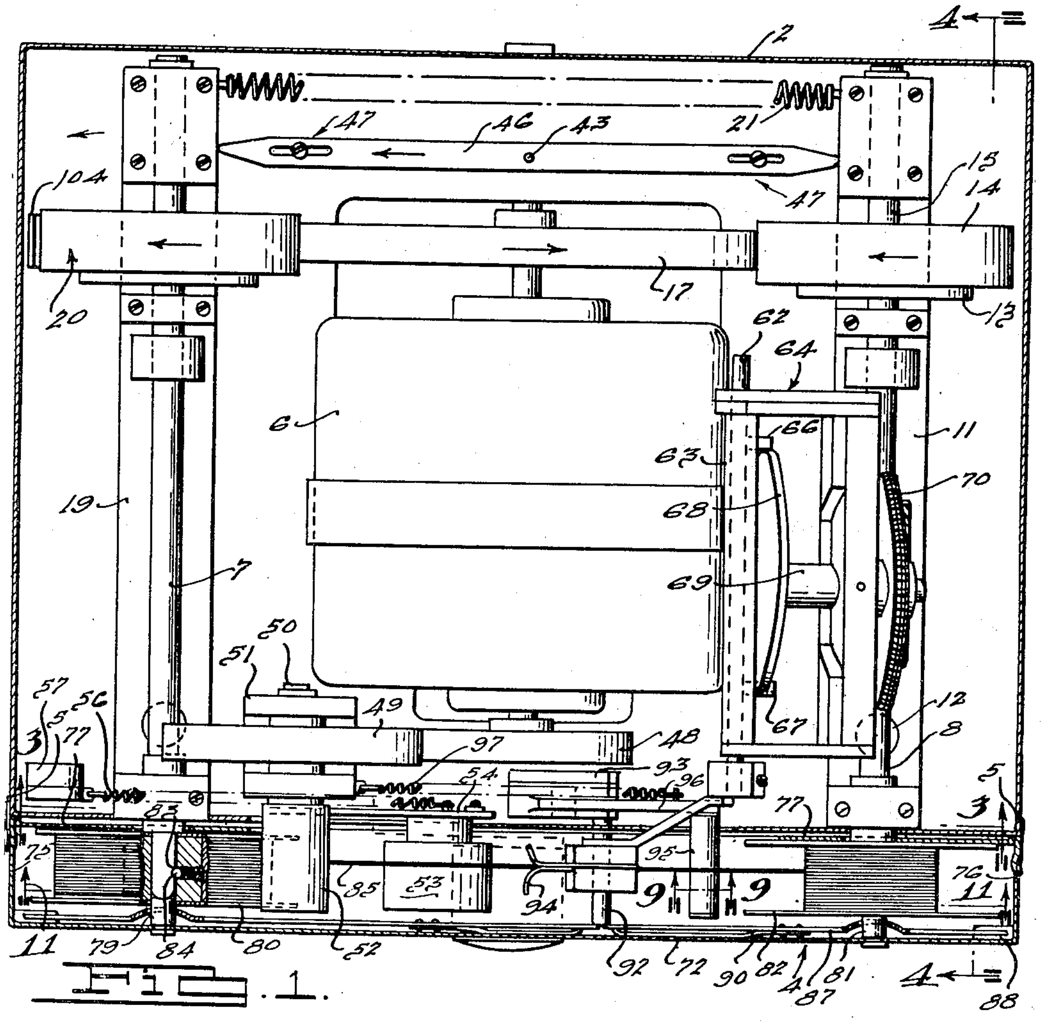
Figure 10:
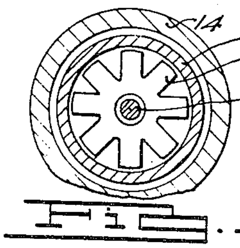
Figure 10 is a fragmentary sectional view taken on the line 10—10 of Figure 4.

Mounted on the chassis is an electric motor 6 which is of a type capable of operating at a substantially constant speed, a spindle 7 for the wire spool, and a spindle 8 for the take-up spool. Suitable means are provided for selectively driving either or both of the spindles 7 and 8 from the motor through magnetic clutches of the eddy-current type, which will permit continuous slipping in the drive connection between the spindles and the motor. Thus, as best shown in Figures 1 and 4, the spindle 8 is journaled in suitable bearings 9 and 10 carried by an elongated block 11, which is pivotally secured to the chassis plate 1 by a vertical pivot pin 12, located adjacent the forward wall of the casing 2. The rearward end of spindle 8 carries a copper cup 13, which, as best shown in Figures 4 and 10, surrounds a multi-pole permanent magnet rotor 13*a*, and fits within an iron or soft steel housing 14. The housing 14 and the permanent magnet 13*a* are fixed to a shaft 15. Shaft 15 is journaled in a bearing 16, which is likewise fixed to the elongated block 11. The elements 13, 13*a*, and 14 constitute an eddy-current clutch, with the result that on rotation of the housing 14 a rotary torque will be transmitted to the cup 13 and, consequently, to the take-up spindle 8. The shaft of motor 6 is provided at its rear end with a drive roller 17 having a rubber rim 18 adapted to operatively engage and rotate the housing 14, and, consequently, apply a rotating force to the spindle 8.

The spindle 7 is similarly supported upon a pivoted block 19 which is identical in construction and mode of operation to the previously described block 11, and the spindle 7 is likewise connected to the drive roller 17 by means of the housing of a magnetic eddy-current clutch 20, which is identical in construction and mode of operation to the previously described magnetic clutch 13—14. The rearward ends of blocks 11 and 19 are connected by means of a spring 21, which is normally effective to hold the housings of both magnetic clutches in engagement with the roller 17 at the same time, with the result that the spindles 7 and 8 are subject to a winding torque acting in a counterclockwise direction when the motor is running and the remaining parts are in the stop position illustrated in Figure 1. As hereinafter indicated, the wire is so wound on the wire spool and the take-off spool that the winding torque so applied to the spindles 7 and 8 tend to wind the wire on both spools simultaneously and, consequently, substantially balance each other. As a result, when parts are in the position illustrated in Figure 1 and the motor is started, all slack is taken out of the wire between the spools, but no substantial movement of the wire will occur.

Figure 11:
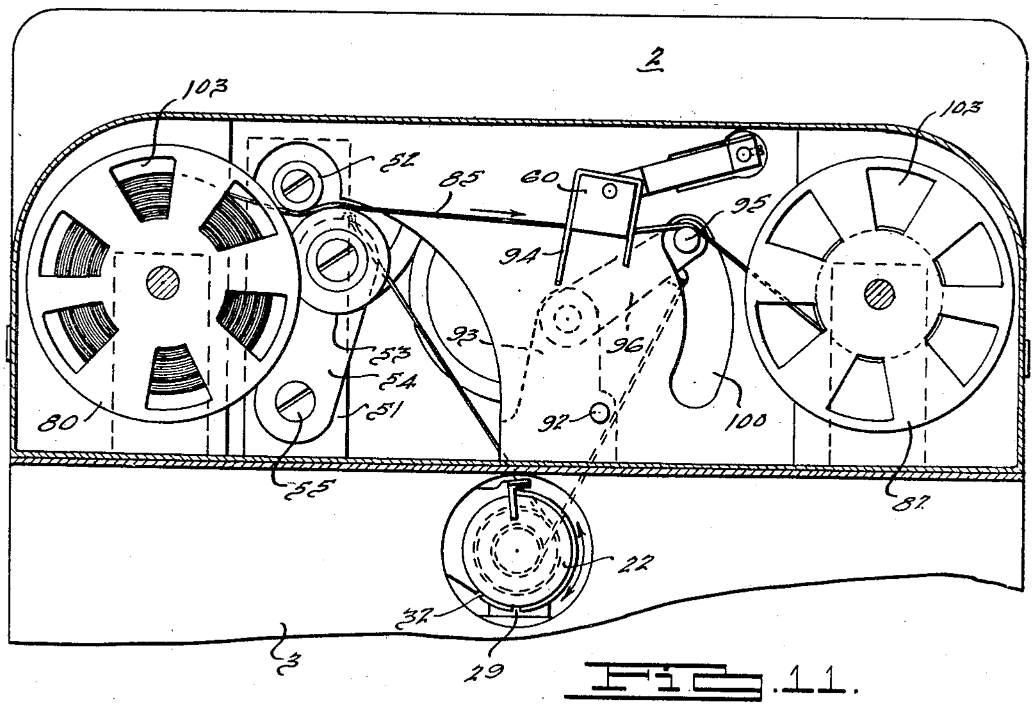
Figure 11 is a sectional view taken on the line 11—11 of Figure 1, showing the parts in running position.

Means are provided for selectively disconnecting either one of the spindles 7 and 8 from the motor in order to effect a winding of the wire on the spool associated with the spindle, which remains connected to the motor. In addition, means are provided for engaging and feeding the wire toward the take-up spool when the wire spool is disconnected from the motor. As best shown in Figures 1, 2, 5, 7, and 8, the means for controlling the connection between the spindles 7 and 8 and the motor comprises a manually operable control knob 22, which is fixed to shaft 23 journaled in suitable bearings 24 and 25 carried by the underside of the chassis plate 1. The control knob 22 is provided with a slot within which is pivotally mounted a detent lever 26 having a finger engaging projection 27. The tail end of the lever 26 is adapted to engage within any one of three slots formed in a depending bracket 28 which is likewise secured to the underside of the plate 1. When the parts are in the position illustrated in Figures 1, 2, 3, 4, 5, 6, and 7, the lever is engaged within the lowermost slot 29 by means of the compression spring 30, shown best in Figure 5. When it is desired to rotate the control knob the lever 26 is disengaged from the knob by depressing the projection 27. The knob may then be rotated in either direction from the stop position. On rotation in a counterclockwise direction through approximately 180 degrees the lever will engage within a slot 31 in the bracket 28. This position of the knob is the running position. On clockwise rotation of the knob from the stop position the lever may be engaged within a notch 32, which, as best shown in Figure 11, is displaced by a slight distance from the notch 29. This position of the knob is the rewind position.

When the control knob 22 is in its stop position a projection 33 on a collar 34, which is fixed to the shaft 23, engages the button 35 of a normally closed motor switch 36 and thereby opens the circuit of motor 6. It will be apparent that upon movement of the control knob 22 in either direction from the stop position illustrated in Figure 6, the projection 33 will disengage the button 35 and permit the switch to close the motor circuit and thereby start the motor. The motor switch 36 is fixed in any suitable manner to a bracket 37 secured to the underside of the chassis plate 1.

Figures 5, 8:
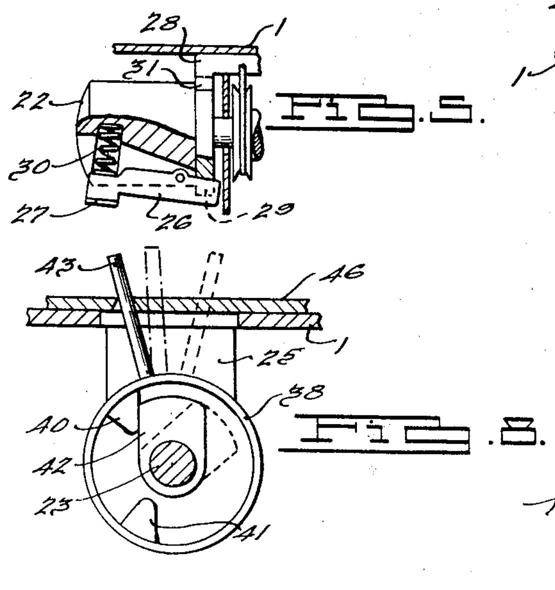
Figure 5 is a fragmentary side elevation of the control knob shown partly in section.
Figure 8 is a view similar to Figure 7 showing the parts in running position.
Figure 7:
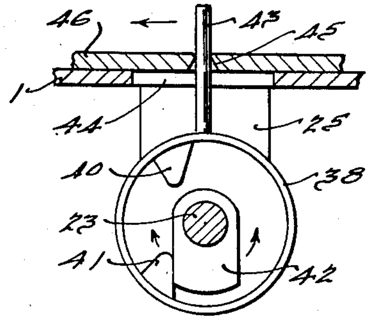
Figure 7 is a fragmentary sectional view taken on the line 7—7 of Figure 4.
Figure 14:
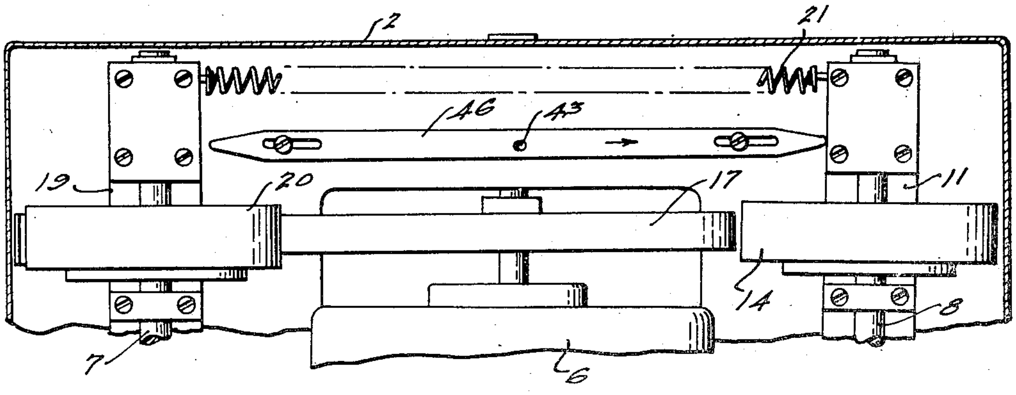
Figure 14 is a view similar to 12 showing the parts in rewind position.

As best shown in Figures 1, 7, and 8, a cylindrical member 38 is freely journaled by means of a hub 39 on the shaft 23 and is provided with a pair of internal projections 40 and 41 adapted to co-operate with a lug 42 on shaft 23 to provide a lost motion connection between the cylindrical member 38 and the shaft 23. The member 38 is provided with a radially projecting arm 43 which extends upwardly through opening 44 in the chassis plate 1 and into an opening 45 in a bar 46. The bar 46 is slidably carried on the chassis plate 1 by means of a pair of pin and slot connections indicated generally at 47. The length of the slide bar 46 is such that when the housings of the spindle drive clutches 14 and 20 are simultaneously held in engagement with the motor roller 17 by means of a spring 21, the extremities of the bar 46 just touch or clear the pivoted blocks 11 and 19 in the manner best shown in Figure 1. Consequently, rotation of the cylindrical member 38 in either direction from the stop position shown in Figure 7 will shift the slide bar 46 and thereby cause disengagement of one or the other of the housings 14 and 20 from the motor roller 17. When the control knob 22 is rotated counterclockwise to approximately 180 degrees, the final portion of the movement of the shaft 23 will result in engagement of the lug 42 with the projection 40, and a rotation of the cylindrical member 38 from the position shown in Figure 7 to the solid line position shown in Figure 8, thereby shifting the slide bar in a direction to disengage the housing of spindle drive clutch 20 from the motor roller 17. Rotation of the control knob in a clockwise direction from the stop position will rotate the cylindrical member 38 in the opposite direction and thereby cause disengagement of the clutch housing 14 from the motor roller 17 in the manner shown in Figure 14. In either of the two positions of adjustment the parts will be held against displacement under the influence of spring 21 by engagement of the detent lever 26 within one or the other of the notches 31 and 32.

The means for engaging and driving the wire when it is being wound upon the take-up spool is best shown in Figures 1, 3, 4, and 11. This means comprises a roller 48 mounted on the forward end of the motor shaft and constantly in engagement with a roller 49 which is fixed to a shaft 50 journaled in a bracket 51 carried by the chassis plate 1. The shaft 50 projects forwardly through the front wall of the casing, as best shown in Figure 1, and carries a nonferrous metallic wire drive roller 52. In order to effect a driving engagement between the wire and the roller 52 there is provided a rubber roller 53 journaled on an arm 54 which is pivoted on a pin 55 fixed to the previously mentioned bracket 51. A spring 56, best shown in Figure 3, extends between the outer extremity of the lever 54 and a bracket 57 carried by the chassis, and thereby constantly urges the roller 53 toward engagement with the roller 52 in order to pinch the wire between the rollers 52 and 53 and thereby establish a drive connection with the wire.

Figure 3:
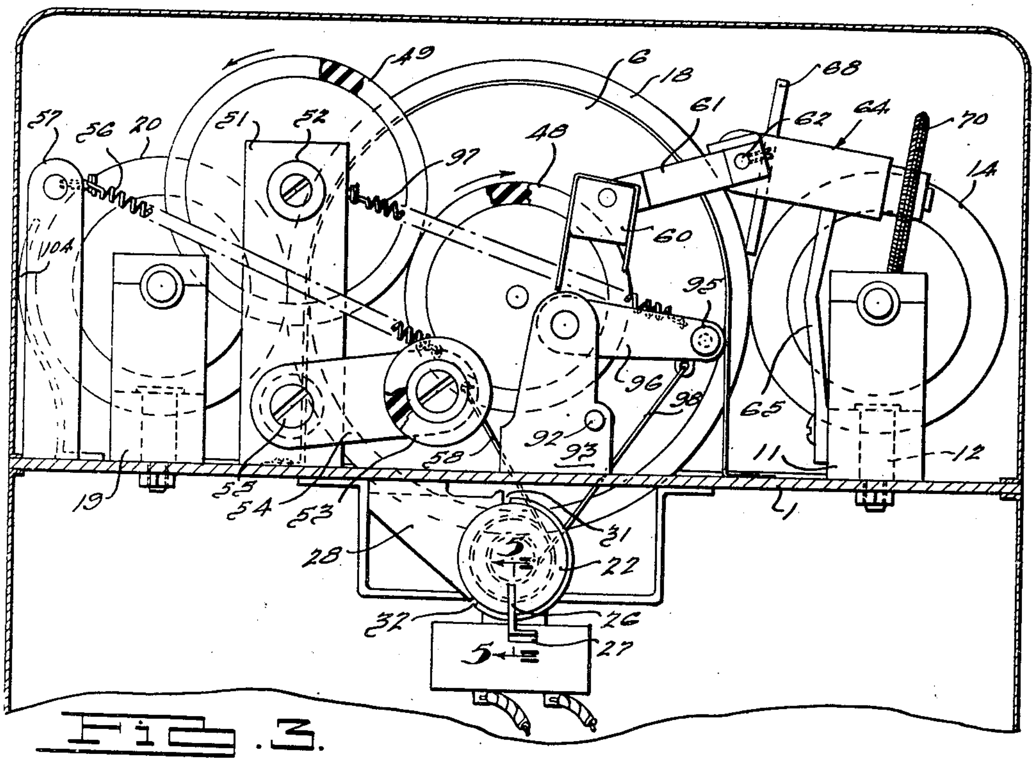
Figure 3 is a sectional view taken on the line 3—3 of Figure 1.
Figure 9:
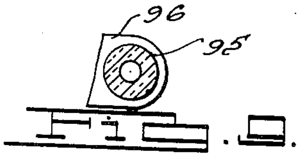
Figure 9 is a fragmentary sectional view taken on the line 9—9 of Figure 1.
Figure 6:
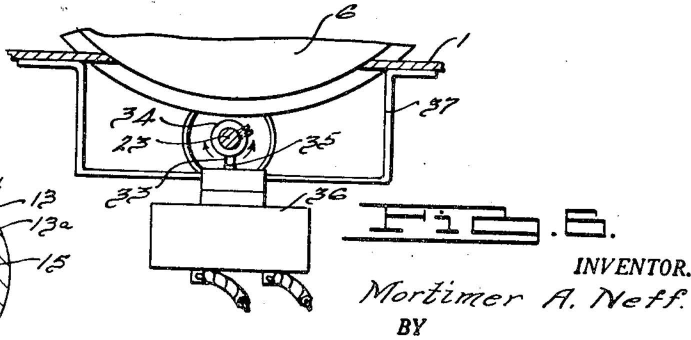
Figure 6 is a fragmentary sectional view taken on the line 6—6 of Figure 4.
Figure 13:
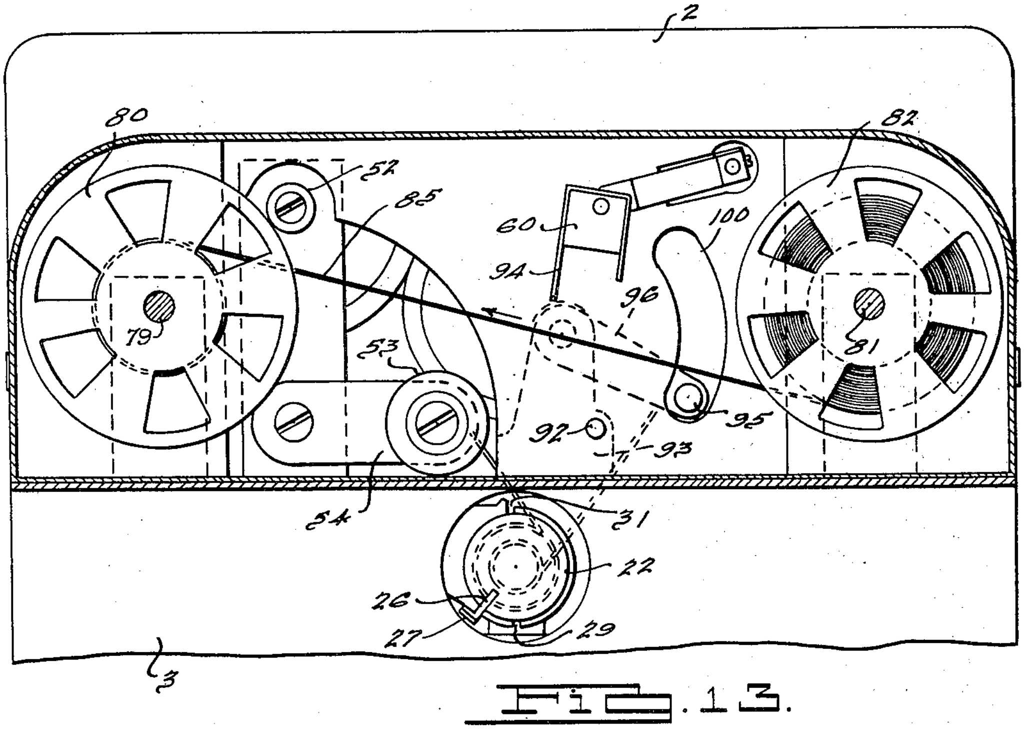
Figure 13 is a view similar to Figure 11 showing parts in rewind position.

When the control knob is in the stop position, as illustrated in Figure 3, or in the rewind position, as illustrated in Figure 13, the roller 53 is held out of engagement with the roller 52 by means of a wire or string 58 which is fixed at one end to the outer end of lever 54 and is wrapped about a spool 59 fixed to the shaft 23 in such a manner that on counterclockwise rotation of the shaft 23 by means of control knob 22 the roller 53 will swing upwardly under the influence of spring 56 and engage the drive roller 52, and vice versa. The arrangement is such that operative engagement between the rollers 52 and 53 will not occur until after the motor 6 has been started and clutch housing 20 is disengaged from the motor roller 17. This is an important feature of the construction inasmuch as it is necessary to start the rotation of the take-up spindle 8 before a wire driving engagement occurs between the wire and the wire driving roll 52, in order to prevent throwing a loop in the wire between the drive roller 52 and the take-up spool. Since the motor is started well in advance of the disengagement of drive roller 20 from the motor roller 17, winding power will be delivered to both spindles 7 and 8, and the wire will be tensioned before disengagement of the spindle drive roller 20 occurs. Thus, as soon as the spindle drive roller 20 is disengaged from the motor roller 17, the driving torque applied to the take-up spindle 8 will immediately start winding rotation of the take-up spool mounted thereon. Very little time period is required to bring the speed of the wire up to such a point that no loop will be thrown upon subsequent engagement of the drive roller 52 with the wire, but the mechanism must be so constructed as to provide the necessary interval.

In order to insure that the recording or pickup head will make proper engagement with the wire during recording or the reproducing of sound without interfering with the necessary level winding of the wire on the take-up spool and to avoid the use of separate level-winding mechanisms, the sound pickup or recording head, in accordance with the present invention, is itself mounted upon a level-winding mechanism in the manner best illustrated in Figures 1, 3, and 4. As there shown, the pickup head 60, which is of conventional construction, is fixed to a bracket 61 carried by a bar 62 slidably journaled in a tube 63 fixed to a framework, indicated generally at 64 in Figure 1. The framework 64 is carried by bracket 65 secured to the pivotal block 11 in the manner best shown in Figure 3. The tube 63 is provided with a pair of spaced slots, through which project pins 66 and 67, that are fixed to the slide bar 62 and operatively engage a heart-shaped cam 68 of the type commonly employed in level-winding mechanisms. The cam 68 is fixed to a shaft 69 journaled in the frame 64, and the shaft carries a worm wheel 70 that meshes with a worm 71 fixed to the spindle 8. As a result of this arrangement the head 60, which contains the usual wire engaging groove, will oscillate back and forth in a direction parallel to the spindle 8 in timed relation with the speed of rotation of the spindle and will thus insure a level-winding of the wire upon the take-up spool.

Figure 2:
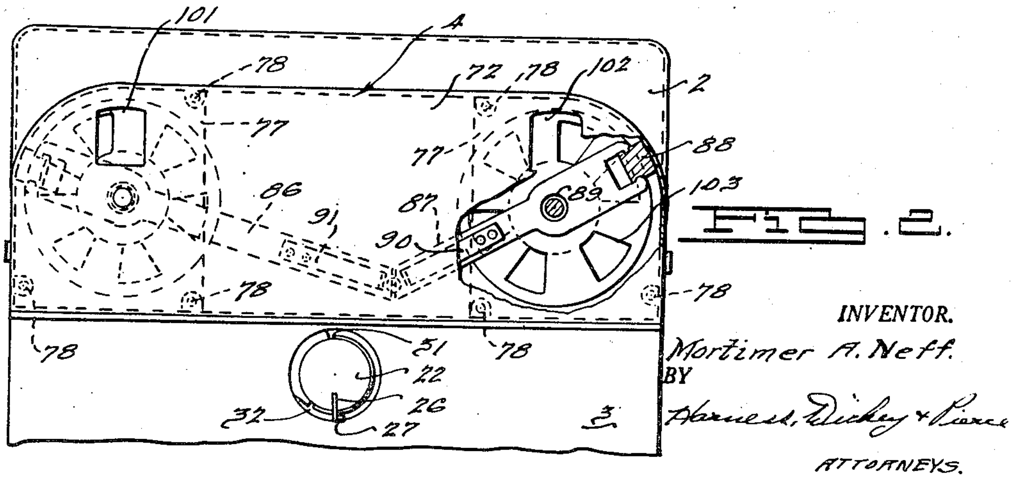
Figure 2 is a front elevation of the chassis showing the magazine, partly in section, installed thereon.

The improved form of removable spool magazine employed in connection with the present invention is shown best in Figures 1, 2, and 3. As there shown, the magazine comprises a casing having a front wall 72, a top wall 73, a bottom wall 74, and end walls 75 and 76. The rear of the casing is open except for a pair of plates 77 which are removably secured to the back of the magazine at each end by means of screws indicated in dotted lines at 78 in Figure 2 and which are provided respectively with central apertures to receive the spindles 7 and 8. As best shown in Figure 1, the front wall 72 of the magazine is provided with a fixed stub shaft 79 which projects inwardly to a limited extent and is adapted to enter the central opening in a wire spool 80 to hold the spool against displacement when the magazine is removed from the chassis. The arrangement is such that the spool 80 cannot be removed without removing the adjacent removable plate 77. The magazine is also provided with a similar stub shaft 81 adapted to locate the take-up spool 82 in the same manner.

As a result of this arrangement, when the magazine is installed on the chassis in the position illustrated in Figures 1, 2, and 4, the forward extremities of the spindles 7 and 8 will enter the openings in the spools 80 and 82. The forward end of each spindle is provided with recesses 83 adapted to receive a spring pressed ball 84 carried by the associate spool in order to effect a driving engagement between the spool and spindle in the manner best shown in connection with the wire spool 80 in Figure 1. It will be noted, as best shown in Figure 13, that the wire 85 is so threaded on the spools 80 and 82 that the application of counterclockwise torque to both spools simultaneously will tension the wire by tending to wind it on both spools. It will also be noted that the stretch of wire between the spools is located substantially below the drive roller 52 and the head 60. Consequently, when the magazine is installed on the chassis no interference will occur between the wire and either the roller 52 or head 60.

In order to hold the spools 80 and 82 against rotation when the magazine is removed from the chassis, the magazine is provided with a pair of brake levers 86 and 87, shown best in dotted lines in Figure 2. The lever 87 is pivotally mounted, in the manner best indicated in Figure 2, upon block 88 fixed to the forward wall 72 of the cartridge and is provided with an opening 89 through which passes the stub shaft 81. A leaf spring 90 is fixed to the brake lever 87, and by bearing against the wall 72 of the magazine normally urges the lever toward engagement with the take-up spool 82. The brake lever 86 is similarly constructed and mounted and is likewise provided with a spring 91 which acts to urge the lever into engagement with the wire spool 80. The extremities of the brake levers 86 and 87 terminate in close proximity to each other in such manner that when the magazine is applied to the chassis they will be engaged by a stud 92 and forced against the forward wall 72 of the magazine, thus compressing the springs 90 and 91 and releasing the spools 80 and 82. The stud 92 is fixed in any suitable manner on the chassis, as by means of a bracket 93.

In order to insure that the wire 85 will enter the slot in the head 60, the head is provided with a fork 94, shown best in Figures 1 and 13, the arms of which are spread apart at their lower ends and terminate just above the highest point which the stretch of wire between the spools can assume when the magazine is being applied to the chassis. Consequently, when the magazine is installed the wire will pass beneath the lower extremities of the fork 94 and into a position between the downwardly projecting arms of the fork. Means are provided for raising the wire into the head at the start of the playing or recording operation. This means comprises not only the previously mentioned roller 53 but also a wire engaging roller 95. The latter roller is journaled on the end of pivoted arm 96, carried by the previously mentioned bracket 93. As best shown in Figure 3, a spring 97 is connected between the extremity of arm 96 and bracket 51, thus acting normally to rotate the arm 96 in a counterclockwise direction and thereby elevate the wire 85 into the space between the arms of the fork 94 and thus into the groove of the head 60. A wire or string 98 having one end connected to the outer end of the arm 96 is wrapped around a spool 99 fixed to the shaft 23 in such a manner that counterclockwise rotation of the knob 22 swings the arm 96 in a clockwise direction and lowers the wire engaging roller 95. It will be noted in Figures 11 and 12 that the front wall of the casing 2 is provided with a slot 100 through which the roller 95 projects. The front wall is also cut away to provide for forward projection of the rollers 52 and 53.

As best shown in Figure 2, the front wall 72 of the magazine is provided with a pair of openings 101 and 102 through which the spools may be observed. Inasmuch as the spools are provided with a plurality of openings 103 it is possible by inspection to determine how much wire remains on the spools during the playing or rewinding operations and thus to stop the machine before the wire is entirely unwound from either one of the spools. It will be appreciated that, if desired, an automatic stopping mechanism, such as that disclosed in the copending application of Mortimer A. Neff, Serial No. 577,849, now abandoned, may be employed, if desired.

The operation of the mechanism is, as follows: Normally, when the magazine is removed from the machine all, or substantially all, of the wire will be wound on the wire spool 80. However, since the machine may be stopped and the cartridge removed at any time, substantially all or any part of the wire may be wound on the take-up spool 82. In any event the brake levers 86 and 87 will be in engagement with the spools to prevent rotation thereof, and the stretch of wire between the spools will extend in approximately the location indicated in Figure 13. Since the control knob 22 will be in its stop position shown in Figure 3, the rollers 53 and 95 will be in their lower positions there illustrated and, consequently, the magazine may be inserted in position without the necessity of any threading manipulations of the wire. Thereafter, if it is desired to either reproduce or record sound, the control knob 22 is rotated clockwise through approximately 180 degrees until the latching lever 26 engages in the notch 31. The first portion of such motion will start the motor 6 and thus impose a winding torque on both spools. Since the brake levers 86 and 87 will have been released by engagement with the stud 92, upon installation of the magazine the winding torque thus imposed upon the spools 80 and 82 will take up any slack in the wire extending between them.

Figure 12:
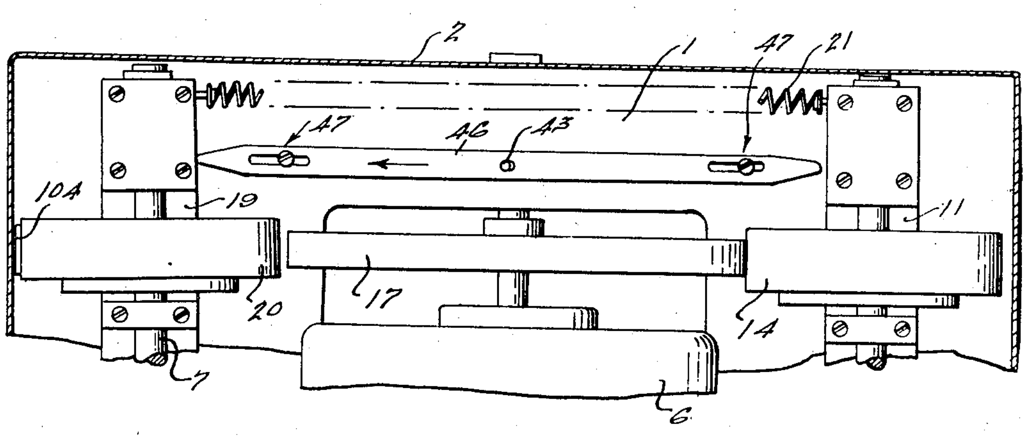
Figure 12 is a fragmentary plan view of a portion of the mechanism shown in Figure 1 showing the parts in running position.

Thereafter, as the control knob continues to rotate in a counterclockwise direction, arm 43 will shift the slide bar 46 to the position shown in Figure 12 and effect disengagement of the clutch housing 20 on spindle 7 from the motor roller 17. This immediately eliminates the winding torque applied to the wire spool 80 and permits the take-up spool 82 to start rotating in a winding direction under the influence of the torque imposed through the magnetic clutch 14.

Thereafter, on further movement of control knob 22 in a counterclockwise direction the roller 53 will pinch the wire 85 against the drive roller 52 and start feeding the wire toward the take-up spool. By this time the take-up spool will have gotten up sufficient speed so that feed of the wire by the roller 52 will not throw a loop in the wire. In this connection the strength of the magnetic clutches should be sufficient to bring the take-up spool up to speed in the minimum time interval which is available before the roller 52 begins to feed the wire. The sizes of the motor roller 17 and the clutch housing 14 are so selected with respect to the sizes of the rollers 48, 49, and 52 that the motor will tend to rotate the take-up spool 82 at a speed in excess of that corresponding to the speed of the wire, as determined by the speed of rotation of the roller 52. Consequently, the yielding torque transmitted to the spool 82 by the magnetic clutch 14 will maintain the wire 85 in tension.

It will be observed that simultaneously with the upward movement of the roller 53, the roller 95 also moves upwardly, thereby co-operating with roller 53 to elevate the wire into the head 60. At or about the time that the roller 53 pinches the wire against the roller 52, the slide bar 86 will have shifted the pivoted block 19 sufficiently to the left, as viewed in Figures 1 and 12, to cause engagement of the housing of the magnetic clutch 20 with a stationary resilient brake member 104, shown best in Figures 1, 3, and 12. The brake member 104 holds the casing of the magnetic clutch 20 stationary and hence supplies a braking force to the unwinding rotation of the wire spool 80. This is desirable to maintain the wire in tension between the wire spool 80 and the drive roller 52, so that as the level-wound wire on the wire spool 80 traverses back and forth across the face of the spool it will cause a similar traverse of the wire back and forth between the rollers 52 and 53. Final running position of the parts is shown in Figures 11 and 12 wherein the wire is being fed toward the take-up spool at a speed determined by the speed of the roller 52. In this direction of movement the apparatus may be employed either to record or reproduce sound previously recorded on the wire 85. It will be understood that in accordance with conventional practice the head 60 will include not only a pickup or recording coil but also an erase coil which is employed only during the recording of sound upon the wire. Since the details of the head construction as well as the electrical circuits associated therewith form no part of the present invention, they are not illustrated or described in detail.

When it is desired to stop the machine during the recording or reproduction of sound the control knob 22 is rotated clockwise from the position shown in Figure 11 to the stop position shown in Figure 3. During such rotation, the roller 53 is first disengaged from the drive roller 52, thereby permitting the wire to move out of operative engagement with the drive roller 52, and thereafter the housing of clutch 20 is shifted into engagement with the motor roller 17 by spring 21. This imposes a strong resistance to the movement of wire onto the take-up spool and will normally either stop winding of wire onto the take-up spool or actually start a rewind operation, depending upon the relative strengths of the magnetic clutches 14 and 20 and the relative amounts of wire on the spools 80 and 82. In any event the throwing of a loop, which would result from an overrunning of the wire spool, is prevented. When the control knob returns to the stop position illustrated in Figure 3 the motor will be stopped and all movement of the parts terminated.

Thereafter if it is desired to rewind the wire, the knob 22 is rotated clockwise until the lever 26 engages in notch 32. The parts are then in the position shown in Figures 13 and 14 in which the housing of clutch 14 has been shifted out of engagement with the motor roller 17. As a result, the winding torque applied to the wire spool 80 through magnetic clutch 20 is unopposed and a very rapid rewind of the wire will occur. During such rewind operation the wire is disengaged from the head 60 as well as the rollers 52, 53, and 95. Consequently, it will automatically level-wind from the take-up spool to the wire spool at a high rate of speed. When the rewinding operation is complete the control knob is simply returned to the stop position, and all portions of the mechanism cease operating. Since the initial return movement of the knob effects engagement between the motor roller 17 and the housing of clutch 14, unwinding of the take-up spool is retarded or stopped before the motor is shut off, thus avoiding the formation of slack in the wire extending between the spools. It will be understood that the control knob 22 may be turned to its stop position at any time during recording, sound reproduction, or rewind, and the magazine thereupon removed from the chassis.

It will be apparent that there is provided, in accordance with the present invention exceedingly simple and rugged mechanism capable of performing all of the operations required in the recording, reproduction or rewinding movements of the wire in a magnetic wire sound recording and reproducing apparatus of the type employing a removable magazine for the wire spool and take-up spool. While one feature resides in the use of a head which is mounted on a level-winding mechanism it will be appreciated that the remaining features of the invention may be employed in conjunction with a stationary head either with or without auxiliary level-winding mechanism. Moreover, if desired, the type of stationary head employed may be constructed in accordance with the disclosure of the copending application of William P. Haboush, Serial No. 608,391, now abandoned, filed concurrently herewith.

While the invention has been described as of peculiar utility in connection with removable magazine type machines, wherein the preferred form of wire drive includes means engageable with the wire at a point between the two spools, it will be appreciated that the mechanism for selectively energizing either of the spools may also be employed in the type of machine in which the wire is fed solely by rotation of the take-up spool, and the size of the spool is made sufficiently large to eliminate objectionable variations in the speed of the wire for a constant speed of rotation of the spool. In such a mechanism, if desired, a roller fixed to the spindle 8 may be substituted for the magnetic clutch 14.

While only one form of the invention is shown and described, it will be apparent that variations in the details of construction may be indulged in without departing from the spirit of the invention or the scope of the appended claims.

What is claimed is:

1. In a wire reeling mechanism for a magnetic wire sound recording and reproducing mechanism, a spindle for supporting a wire spool, a second spindle for supporting a take-up spool, a motor, a support, a separate journal member for each spindle pivotally mounted on the support on an axis other than the spindle axis, a spindle driving roller supported on each member for driving the spindle journaled on the member, a drive roller connected to the motor and adapted to cooperate with said spindle driving rollers to drive both spindles in a winding direction, means constantly tending to swing said members about their pivot axis in a direction to cause operative engagement between said spindle driving rollers and said drive roller, and means for selectively swinging either of said members in an opposite direction to disengage the spindle driving roller thereon from the drive roller.

2. In a wire reeling mechanism for a magnetic wire sound recording and reproducing mechanism, a spindle for supporting a wire spool, a second spindle for supporting a take-up spool, a motor, a support, a separate journal member for each spindle pivotally mounted on the support on an axis other than the spindle axis, a spindle driving roller supported on each member for driving the spindle journaled on the member, a drive roller connected to the motor and adapted to cooperate with said spindle driving rollers to drive both spindles in a winding direction, means constantly tending to swing said members about their pivot axes in a direction to cause operative engagement between said spindle driving rollers and said drive roller, and means for selectively swinging either of said members in an opposite direction to disengage the spindle driving roller thereon from the drive roller, stationary brake means carried by the support and means connected to one of the spindles and engageable with said brake means when the associated journal member is swung in said opposite direction.

3. A wire reeling mechanism for a magnetic wire sound recording and reproducing mechanism including a spindle for driving a wire spool, a second spindle for driving a take-up spool, a pair of rotatable drive elements aligned respectively with each of said spindles, a separate electromagnetic eddy current clutch connecting each of said elements to its aligned spindle, each of said clutches having a housing fixed to the associated driving element, a common drive roller normally in driving contact with both of said housings and effective to rotate said elements in a direction tending to wind wire on both spools, and means for selectively disengaging the housings from the drive roller.

4. A wire reeling mechanism for a magnetic wire sound recording and reproducing mechanism including a spindle for driving a wire spool, a second spindle for driving a take-up spool, a pair of rotatable drive elements aligned respectively with each of said spindles, a separate electromagnetic eddy current clutch connecting each of said elements to its aligned spindle, each of said clutches having a housing fixed to the associated driving element, a common drive roller normally in driving contact with both of said housings and effective to rotate said elements in a direction tending to wind wire on both spools, means for selectively disengaging the housings from the drive roller, and means effective when one of said housings is disengaged from the drive roller for resisting rotation of said one housing.

MORTIMER A. NEFF.

REFERENCES CITED

The following references are of record in the file of this patent:

UNITED STATES PATENTS

| Number | Name | Date |
|---|---|---|
| 1,665,784 | Hornauer | Apr. 10, 1928 |
| 1,844,224 | Klappenecker | Feb. 9, 1932 |
| 1,883,560 | Chipman | Oct. 18, 1932 |
| 1,886,856 | Warwick | Nov. 8, 1932 |
| 2,051,036 | Foster et al. | Aug. 18, 1936 |
| 2,091,756 | Fodor | Aug. 31, 1937 |
| 2,248,790 | Stapelfeldt | July 8, 1941 |
| 2,349,018 | Tasker | May 16, 1944 |
| 2,351,005 | Camras | June 13, 1944 |
| 2,369,017 | Camras | Feb. 6, 1945 |
| 2,408,320 | Kuhlik | Sept. 24, 1946 |
| 2,412,318 | Camras | Dec. 10, 1946 |